Patented Nov. 28, 1939

2,181,383

UNITED STATES PATENT OFFICE 2,181,383

PROCESS FOR THE PREPARATION OF LIGHT-SENSITIVE EMULSIONS

Carl Adolf Schleussner, Frankfort-on-the-Main, Germany

No Drawing. Application March 23, 1936, Serial No. 70,541. In Germany March 22, 1935

4 Claims. (Cl. 95—7)

(Granted under the provisions of sec. 14, act of March 2, 1927; 357 O. G. 5)

It is known to expose photographic emulsions to oscillations, to increase the sensitivity thereof. The effect of the oscillations in such cases is substituted for the water bath or other heat source.

Experiments have shown that the emulsions prepared by this process possess no substantial practical advantages as compared with those prepared by mere heating, and only involve a considerably increased expenditure.

It has now been found however that a special effect is obtained by submitting the photographic emulsions during one or more of the various stages of their treatment to electrical, electromagnetic or mechanical oscillations of varying size with simultaneous cooling, so that the temperature at which the treatment of the emulsions is carried out is less than that formerly employed for photographic emulsions. Electrical high frequency oscillations such as are used in short wave diathermy, short broadcasting waves and sound waves are examples of oscillations which may be used according to the present invention. In the "Ausführlichen Handbuch der Photographie" Volume III, Part I, of Dr. Ing. Fritz Wentzel, Halle 1930, published by Wilhelm Knapp, is described the present position as regards the preparation of emulsions. Reference is made first of all to page 107 of this publication where it is said "that differences in ripeness are caused finally also by the fact that certain portions of the emulsion such as that portion near the walls of the vessel receive a different amount of heating from those in the middle of the vessel. Differences in the ripeness of an emulsion cannot be prevented by careful continual stirring during the admixing".

Moreover on page 102, it is stated: "If the water and gelatine content of an emulsion is reduced by too great an amount, very sensitive silver bromide is certainly formed easily, but the mixing of a concentrated silver nitrate solution with a concentrated solution of a bromine salt gives a coarse and grainy emulsion of poor photographic properties, and, as has already been mentioned, too much silver bromide settles out because of the imperfect carrying powers of the gelatine".

It is possible by using the process according to the present invention to increase the concentration at which the formation of silver bromide takes place by 50%, and, what is more, to reduce the gelatine content by 50% or over as compared with normal emulsions, without any curling up or the formation of a coarse and grainy emulsion. The especial advantages of this process accordingly consist in the fact that at lower temperatures the treatment can be carried out with higher concentrations of silver bromide and lower concentrations of gelatine without any resultant fog or sediment appearing in the emulsion. The effect can be still more increased by the addition to the emulsion of substances which have no chemical action upon the emulsion, but which increase the activity of the oscillations. Examples of the materials which are suitable in this connection are colloidal silver, fine glass beads or glass dust.

The treatment of the emulsion with oscillations according to the present invention may be carried out during any stage in the preparation of this emulsion for use, for example during the cold-ripening step, if such be employed, during the period of interaction of the silver and halide salts, or during a subsequent stage in the preparation. The amount of artificial cooling will then be so chosen that a temperature appropriate to the particular stage in the preparation is maintained. Preferably, however, the emulsion is treated with the oscillations throughout the whole of its preparation.

The process according to the invention is explained more precisely by the one example hereafter:

An emulsion of the normal kind with 600 gms. of silver, as usually employed in the photographic emulsion art, was treated by three parallel tests as follows, (1) Emulsified, digested and redigested at 40° C. by warming with hot water.

(2) Treated at 40° C. by warming with electrical oscillations.

(3) Treated with electrical oscillatory energy and submitted to simultaneous cooling with water at a temperature of 15° C., whereby the emulsifying, digestion and redigestion took place at 38° C.

The remaining chemical and other experimental conditions were the same in every respect in all three experiments. The oscillations were supplied to the emulsion by means of an emitter and their wavelength was 100 metres.

The emulsions prepared as indicated above were treated and run-in by the usual methods. Examination of the resultant products by the DIN method gave the following:

Experiment 1 _____ 16/10° DIN    0.3 Fog
Experiment 2 _____ 16/10° DIN    0.3 Fog
Experiment 3 _____ 18/10° DIN    0.2 Fog The solubility and the fine granulation were tested by a screening method. The results are given below, the solubility being greater, the smaller the corresponding number.

Experiment 1 gave the numeral value 5.
Experiment 2 gave the numeral value 5.
Experiment 3 gave the numeral value 3–4.

Moreover Experiment 3 gave a 10% better yield from the same quantity of silver, in spite of the smaller fog density as compared with Experiments 1 and 2. From this it is apparent that the decomposition of the gelatine is less in the case of Experiment 3 than in the other two experiments. The smaller fog-density which occurs in the case of Experiment 3 in spite of increased sensitivity and fine granulation is particularly notable.

In the claims the words glass particles include glass beads and/or glass dust.

The use of electrical oscillations of approximately 100 meters wave length and in the neighborhood of 38° C. is critical to this process.

What I claim is:

1. A method of preparing a photographic emulsion comprising treating the emulsion with oscillations of approximately 100 meters wave length thus tending to produce a substantial increase in temperature of the emulsion, and artificially cooling the emulsion during said treatment to maintain the emulsion at a substantially constant temperature at about 38° C.

2. A method of improving photographic emulsions comprising adding glass beads to the emulsion, exposing the emulsion to oscillations of approximately 100 meters wave length, thus tending to produce a development of heat, and maintaining the temperature of emulsion substantially constant by cooling at about 38° C.

3. A method of preparing photographic emulsions, comprising adding glass particles to the emulsion, exposing the emulsion to oscillations of approximately 100 meters wave length thus tending to produce a development of heat, and maintaining the temperature of the emulsion substantially constant by cooling at about 38° C.

4. A method of treating a photographic emulsion, comprising emulsifying, digesting and redigesting the emulsion at 38° C., submitting the emulsion to the action of an excess of oscillations of approximately 100 meters wave length thus tending to produce a substantial development of heat, and simultaneously maintaining the emulsion at 38° C. by cooling with water at 15° C.

CARL ADOLF SCHLEUSSNER.